(12) United States Patent
Kidwell et al.

(10) Patent No.: US 9,401,839 B2
(45) Date of Patent: Jul. 26, 2016

(54) GENERATION AND CONTROL OF NETWORK EVENTS AND CONVERSION TO SCADA PROTOCOL DATA TYPES

(75) Inventors: Beau Kidwell, Clarkston, WA (US);
Mark Weber, Pullman, WA (US);
Daniel N. Morman, Litchfield, AZ (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 1090 days.

(21) Appl. No.: 12/351,079

(22) Filed: Jan. 9, 2009

(65) Prior Publication Data

US 2009/0254655 A1    Oct. 8, 2009

(51) Int. Cl.

| G06F 15/173 | (2006.01) |
| H04L 12/24 | (2006.01) |
| H04L 29/08 | (2006.01) |
| H04W 84/18 | (2009.01) |
| G05B 23/02 | (2006.01) |
| H04L 29/06 | (2006.01) |
| H02J 13/00 | (2006.01) |
| H02H 1/00 | (2006.01) |
| G05B 19/418 | (2006.01) |

(52) U.S. Cl.
CPC ............ *H04L 41/06* (2013.01); *G05B 19/4183* (2013.01); *G05B 23/0208* (2013.01); *H02H 1/0061* (2013.01); *H02J 13/0062* (2013.01); *H04L 41/0226* (2013.01); *H04L 67/12* (2013.01); *H04L 69/08* (2013.01); *H04W 84/18* (2013.01); *G05B 2219/32404* (2013.01); *Y02E 60/74* (2013.01); *Y04S 10/30* (2013.01); *Y04S 40/124* (2013.01); *Y04S 40/166* (2013.01)

(58) Field of Classification Search
USPC ................................................ 709/223–224
See application file for complete search history.

(56) References Cited

U.S. PATENT DOCUMENTS

| 4,591,831 | A | * | 5/1986 | D'Anci | .................. G05F 1/153 323/257 |
| 5,160,926 | A | | 11/1992 | Schweitzer | |
| 5,680,324 | A | | 10/1997 | Schweitzer | |
| 5,793,750 | A | | 8/1998 | Schweitzer | |
| 6,252,510 | B1 | * | 6/2001 | Dungan | ............. G01N 33/0075 340/539.1 |
| 6,380,949 | B2 | | 4/2002 | Thomas | |
| 6,751,562 | B1 | * | 6/2004 | Blackett et al. | ................. 702/61 |
| 6,757,282 | B1 | | 6/2004 | Ofek | |

(Continued)

OTHER PUBLICATIONS

ScadaWorks, "SCADA system development tools," ScadaWorks, all pages, http://www.iclinks.com/public_ftp/DocRelease/scadaworks/RevA/ScadaWorksTechRefManualRevA.pdf.*

(Continued)

*Primary Examiner* — Richard G Keehn
(74) *Attorney, Agent, or Firm* — Jared L. Cherry

(57) ABSTRACT

A system and method is disclosed for receiving a network event in a network format, mapping the network event into a format expected by a central monitoring system, and communicating the mapped network event to the central monitoring system. The system may employ a variety of communication protocols and physical architectures. The system may include an access controller that may connect a plurality of intelligent electronic devices and may be the primary interface with an information system or central monitoring system. The access controller may include a programmable logic engine in compliance with the IEC-61131-3 standard. The access controller may further be configured to implement rules designed to govern actions taken as a result of network information.

41 Claims, 7 Drawing Sheets

(56) References Cited

U.S. PATENT DOCUMENTS

| | | | |
|---|---|---|---|
| 6,792,337 B2* | 9/2004 | Blackett et al. | 700/295 |
| 6,871,224 B1* | 3/2005 | Chu et al. | 709/224 |
| 6,947,269 B2 | 9/2005 | Lee | |
| 7,080,142 B2 | 7/2006 | Galloway | |
| 7,231,003 B2 | 6/2007 | Lee | |
| 7,460,347 B2 | 12/2008 | Schweitzer | |
| 7,460,590 B2 | 12/2008 | Lee | |
| 7,463,467 B2 | 12/2008 | Lee | |
| 8,527,751 B2* | 9/2013 | Errico | 713/165 |
| 2002/0021791 A1* | 2/2002 | Heilmann et al. | 379/189 |
| 2002/0193888 A1* | 12/2002 | Wewalaarachchi | G05B 15/02 700/9 |
| 2003/0030556 A1* | 2/2003 | Costa et al. | 340/506 |
| 2003/0055880 A1* | 3/2003 | Liu et al. | 709/203 |
| 2003/0131096 A1* | 7/2003 | Goringe et al. | 709/224 |
| 2004/0056771 A1* | 3/2004 | Dungan | G01N 33/0075 340/632 |
| 2004/0199663 A1* | 10/2004 | Horvitz et al. | 709/238 |
| 2004/0213263 A1* | 10/2004 | Beckwith | H04W 84/18 370/395.5 |
| 2005/0058451 A1* | 3/2005 | Ross | H04B 10/2504 398/70 |
| 2005/0138111 A1* | 6/2005 | Aton et al. | 709/201 |
| 2005/0280965 A1 | 12/2005 | Lee | |
| 2006/0075105 A1* | 4/2006 | Momtchilov et al. | 709/227 |
| 2006/0083260 A1* | 4/2006 | Wang | H04L 67/025 370/463 |
| 2006/0155908 A1* | 7/2006 | Rotvold et al. | 710/315 |
| 2007/0206644 A1* | 9/2007 | Bertsch | H02J 13/0062 370/503 |
| 2008/0052435 A1 | 2/2008 | Norwood | |
| 2008/0109098 A1* | 5/2008 | Moshier | G06Q 10/06 700/103 |
| 2008/0109099 A1* | 5/2008 | Moshier | G06Q 10/06 700/103 |
| 2008/0154393 A1* | 6/2008 | Reshef | G05B 19/4183 700/65 |
| 2008/0162930 A1 | 7/2008 | Finney | |
| 2008/0195576 A1* | 8/2008 | Sande | G06F 17/30566 |
| 2008/0228553 A1* | 9/2008 | Bryson | G06Q 10/06315 705/7.25 |

OTHER PUBLICATIONS

Muskinja, et al., "Use of TCP/IP protocol in industrial environment", IEEE 2003, all pages, http://ieeexplore.ieee.org/stamp/stamp.jsp?tp=&arnumber=1290778.*

Kezunovic et al, "Automated monitoring functions for improved power system operation and control," IEEE 2005, all pages. http://ieeexplore.ieee.org/stamp/stamp.jsp?arnumber=01489699.*

Cooper Power Systems, SMP Products, Turn Substation Data Into Valuable Enterprise Information, available at: <http://www.cooperpowereas.com/PDF/B110007021.pdf>, Dec. 2008.

A DNP3 Protocol Primer, DNP Users Group, Mar. 20, 2005.

Modbus Application Protocol Specification, Modbus-IDA, Dec. 28, 2006.

IEC 61131-3: a standard programming resource, PLCopen.

Cybectec SMP Products—Turn Substation Data into Valuable Enterprise Information, Cooper Power Systems, Apr. 2008.

News Release: Cooper Power Systems Completes Product Line of Substation Solutions with Cybectec SMP I/O, Cooper Power Systems, Oct. 31, 2007.

Cybectec SMP Products—Turn Substation Data into Valuable Enterprise Information, Cooper Power Systems, Jul. 2007.

Securing Critical Cyber Assets with Cybectec Products, Cooper Power Systems, Jul. 4, 2007.

D400* Substation Data Manager, GE Energy Factsheet, Apr. 2007.

PCT/US2009/038991 Patent Cooperation Treaty International Search Report and Written Opinion, Nov. 9, 2009.

* cited by examiner

GENERATION AND CONTROL OF NETWORK EVENTS AND CONVERSION TO SCADA PROTOCOL DATA TYPES

RELATED APPLICATION

This application claims the benefit under 35 U.S.C. §119(e) of U.S. Provisional Application No. 61/042,349, titled "Generation and Control of Network Events and Conversion to SCADA Protocol Data Types" filed 4 Apr. 2008, naming Beau Kidwell, Mark Weber, and Daniel N. Morman as inventors, and which is hereby incorporated by reference herein in its entirety.

TECHNICAL FIELD

This disclosure relates to communication, generation, and control of operational and network events within an automation, control, monitoring, or protection system. More particularly, this disclosure relates to a method and apparatus capable of generation and control of network events and conversion of network events to a protocol used by a central monitoring system, such as Supervisory Control and Data Acquisition (SCADA) systems, outage management systems, Automatic Meter Reading (AMR) systems, Advanced Metering Infrastructure (AMI) systems, and the like.

BRIEF DESCRIPTION OF THE DRAWINGS

Additional aspects and advantages will be apparent from the following detailed description of preferred embodiments, which proceeds with reference to the accompanying drawings, wherein.

DETAILED DESCRIPTION

Figure 1:
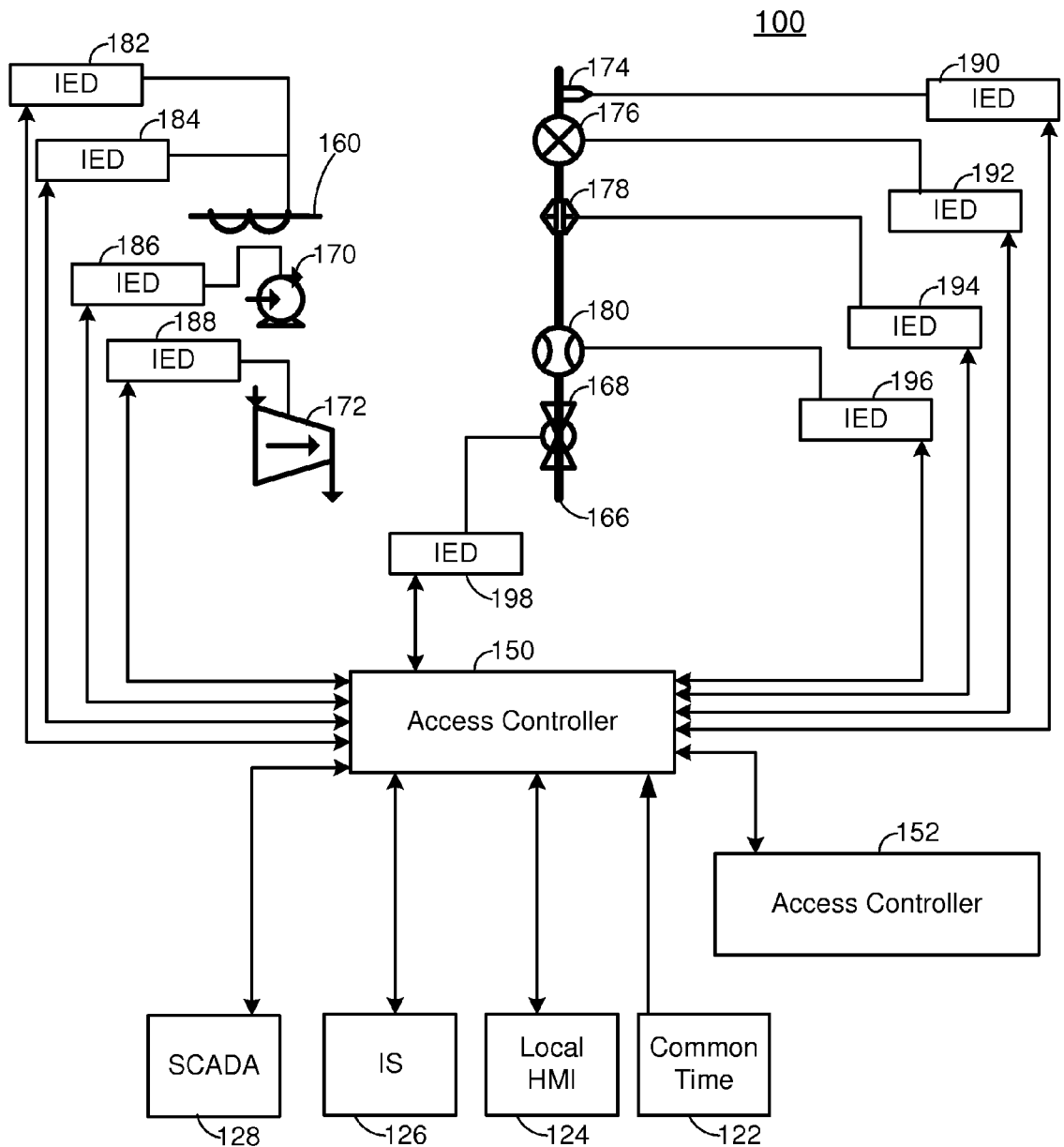
FIG. 1 illustrates a system for automation, control, monitoring, and/or protection of various pieces of monitored equipment.

Modern automation, electric power transmission, and distribution systems typically include intelligent electronic devices ("IEDs") for protection, control, automation, and/or monitoring of equipment in the system. IEDs may be used to monitor equipment of many types including electric transmission lines, current transformers, pumps, compressors, valves, etc.

Generally, an IED may refer to any microprocessor-based device that monitors, controls, automates, and/or protects monitored equipment within the system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs gather status information from one or more pieces of monitored equipment, and may control various aspects relating to the monitored equipment. IEDs may receive information concerning monitored equipment using sensors, transducers, actuators, and the like.

IEDs may be configured to transmit information gathered about monitored equipment to central monitoring system such as SCADA, AMR, and AMI systems. IEDs may be configured to communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. IEDs may also be configured to communicate calculations, such as phasors (which may or may not be synchronized as synchrophasors), events, fault distances, differentials, impedances, reactances, frequency, and the like. IEDs may also communicate settings information, IEDs identification information, communications information, status information, alarm information, and the like. Information of the types listed above, or more generally, information about the status of monitored equipment is referred to as monitored system data.

IEDs may also issue control instructions to the monitored equipment. For example, an IED may be in communication with a circuit breaker, and may be capable of sending a command to open and/or close the circuit breaker, thus connecting or disconnecting a portion of a power system. The IED may also be capable of making load-shedding decisions. In another example, an IED may be in communication with a recloser and capable of commanding reclosing operations. In another example, an IED may be in communication with a voltage regulator and capable of commanding the voltage regulator to tap up and/or down. Other examples of control instructions that may be implemented using IEDs may be known to one having skill in the art, but are not listed here. Information of the types listed above, or more generally, information or instructions directing an IED or other device to perform a certain action is referred to as control instructions.

IEDs may be linked together using a data communications network, and may further be linked to a central monitoring system or an information system. The data communications network may include a variety of network technologies, and may comprise network devices such as modems, routers, firewalls, virtual private network servers, and the like. IEDs and other network devices are connected to the communications network through a network interface module (NIM).

IEDs may be configured to communicate with a central IED, which may also be the primary interface with an information system or central monitoring system. A central IED may be for example the SEL-2020, SEL-2030, SEL-2032, or SEL-3332 available from Schweitzer Engineering Laboratories, Inc. of Pullman, Wash., and also as described in U.S. Pat. No. 5,680,324, the entirety of which is incorporated herein by reference. IEDs communicate information to the central IED including, but not limited to status and control information about the individual IEDs, IED settings information, calculations made by individual IEDs, event (fault) reports, communications network information, network security events, and the like. Central IEDs, or communications processors, may be cascaded in order to increase the number of connections to pieces of monitored equipment. An access controller, as described in detail below, may serve as a central IED or communications processor.

The physical architecture of the data communication network connecting IEDs and other network devices may be any known to one having skill in the art, and may include fiber-optic, contact inputs and outputs, Ethernet, and the like. IEDs may follow any of a number of different protocols in communicating with an access controller as described below. IEDs may all communicate using the same protocol, or may communicate over different protocols to the access controller. Some available communications protocols include, for example, Schweitzer Engineering Laboratories Mirrored Bits® (described in U.S. Pat. Nos. 5,793,750, 6,947,269, and US Patent Application Publication No. 2005/0280965, all assigned to the assignee of this patent application, and the entirety of each of which are incorporated herein by reference), Schweitzer Engineering Laboratories Fast Message, Distributed Network Protocol (DNP) 3.0 Serial, DNP 3.0 LAN/WAN, MODBUS RTU, MODBUS TCP, IEC 61850, IEEE C37.118 and the like. Central monitoring systems may likewise use these same protocols or formats for communicating with individual IEDs or central IEDs.

Individual IEDs, central IEDs, or other network devices may allow users to log into the device to perform actions such as change settings, upgrade systems, conduct tests, gather information, and perform other functions. Some devices may allow a user to login remotely from another location using the communications network. Similarly, other devices connected to the data communications network may allow users to login and perform a variety of tasks.

Improper changes to an IED or other data communications network device may result in disruption of a monitored system. Accordingly, IEDs and other network devices may employ various techniques to ensure that only authorized users are allowed access. IEDs and other network devices may employ various systems to authenticate a user before allowing access to a device or permitting a user to change settings. At a minimum, a password is typically required in order to log into an IED or other network device. Other methods of authentication, for example biometric authentication, may also be used.

IEDs and other network devices may log network related events or statistics such as user logins, user logouts, failed logins, setting changes, updates, tests, repeated password attempts, network diagnostics, unidentified access attempts through restricted Internet Protocol ports, firewall access, packet size, packet latency, and the like. Information of the types listed above, or more generally, information relating to events or statistics pertaining to the data communications network connecting IEDs and other network devices is referred to as network data or a network event.

Network data is typically transmitted or made available only to an information system. The information system generally includes network communication, network security, user administration, Internet and intranet administration, remote network access and the like. The information system uses information about the network to maintain and sustain a reliable, quality, and secure communications network by running real-time business logic on network security events, perform network diagnostics, optimize network performance, and the like. Network events may be automatically pushed to the information system, or may be contained in logs that are accessible upon request to the information system.

Historically, monitored system information has been transmitted to the central monitoring systems, such as a SCADA system. Due to network security and operational concerns, information is not typically shared between the central monitoring systems and the information system. The division between the central monitoring systems and information system may have been beneficial from a network security standpoint in that risk of unauthorized access to the SCADA system is reduced; however, certain information that is typically communicated only to the information system may also be useful to operators of a central monitoring system. Communicating network data to a SCADA control center, for example, may be advantageous because SCADA control centers may be continuously staffed, and SCADA information may be often reviewed in near real-time. Automating the delivery of network events to SCADA may provide a further safeguard to ensure that only authorized users have access to the communications network. Further, centralizing information related both to monitored system data and network data may simplify procedures required to comply with corporate and government regulations.

Network events that may be of use to an operator of a central monitoring system include user logins, user logouts, setting changes, invalid password attempts, network diagnostics, unidentified access attempts through restricted Internet Protocol ports, firewall access, packet size, packet latency, and the like. This data is helpful so that people or systems monitoring the system know who is logging into and out of each network device, which settings are being changed, whether login attempts have failed, and the like. Providing central monitoring system operators access to network events may also help to ensure that correct settings are being applied to each device as changes are made. Access to network information is also helpful in post-event analysis and security analysis that may be required by government or corporate regulations. Such advantages may not have been realized historically because of the security and operational concerns discussed above, and because protocols used to transmit network data to the information system may not be compatible with the infrastructure and protocols used by central monitoring systems.

The systems and methods of this disclosure allow for the mapping of network events to any number of protocols using existing infrastructure. As such, the benefits discussed above may be realized without significant changes to existing infrastructure.

Turning now to FIG. 1, an exemplary protection, control, automation, and/or monitoring system 100 is depicted. FIG. 1 shows various pieces of monitored equipment in communication with various IEDs. For example, an electric power conductor 160 is monitored by two IEDs 182 and 184. IEDs 182 and 184 may monitor the voltage, current, impedance, reactance, phase, or frequency associated with electronic power conductor 160. IED 186 is shown as receiving information from pump 170. IED 186 may monitor pressure, temperature, shaft rotational velocity, flow rate, and/or pump status (e.g. on/off), and the like. IED 188 is illustrated as monitoring a compressor 172. IED 188 may receive information about conditions in the compressor from sensors in the compressor or status of the compressor itself. Further illustrated are IEDs 190-198, each of which is in communication with a sensor or other equipment placed on flow system 166 through which a fluid may be flowing. Various sensors and equipment may be placed on flow system 166 such as valve 168, flow meter 180, IR absorption sensor 178, pressure transducer 176, and temperature transducer 174. Each sensor or equipment may be monitored by an IED 190-198. Alternatively, several of the sensors or several separate pieces of equipment may be monitored by a single IED.

The IEDs 182-198 are all in communication with an access controller 150. Access controller 150 may be configured to receive information from various IEDs and communicate the information to a central monitoring system, such as SCADA system 128, and to information system 126. Access controller 150 may also be in communication with a second access controller 152 in a cascaded configuration. The cascaded configuration permits access controller 152 to receive information from additional IEDs.

Access controller 150 may also be in communication with local human-machine interface (HMI) 124. Local HMI 124 may be located at the same substation as access controller 150. Local HMI 124 may be used to view data from access controller 150 and/or initiate communications with access controller 150 to change settings, issue control instructions, retrieve an event (fault) report, retrieve data, and the like.

Common time source 122 may be available to access controller 150 for providing a common time to access controller 150 and connected IEDs. Common time source 122 may be used by access controller 150 for time stamping information and data. Time synchronization may be helpful for data organization, real-time decision-making, as well as post-event analysis. Time synchronization may further be applied to network communications. Common time source 122 may be any time source that is an acceptable form of time synchronization. For example, common time source 122 may be available from GPS satellites and follow the IRIG-B protocol, may be provided over the WWB or WWVB radio networks, or may be kept locally by access controller 150. Time may be synchronized throughout the system using a SCADA protocol (such as DNP 3.0 or IEC 61850), or using network time synchronization (such as Network Time Protocol or Simple Network Time Protocol). In the absence of a discrete common time source, access controller 150 may serve as the time source by distributing a time synchronization signal (received from one of the sources described).

As illustrated in FIG. 1, communication between SCADA system 128, information system 126, and the IEDs is routed through access controller 150. Centralizing communications using access controller 150 may provide the ability to manage a wide variety of IEDs in a consistent manner. As described in greater detail below, access controller 150 may be capable of communicating with IEDs of various types and using various communications protocols. Access controller 150 may provide a common management interface for managing all connected IEDs, thus allowing greater uniformity and ease of administration in dealing with a wide variety of equipment.

Centralizing communications using access controller 150 may also allow for improved security. Access controller 150 may incorporate various security features, such as an authentication system, firewall, VPN server, and other security features. Routing all communications through access controller 150 allows for devices connected to access controller 150 to benefit from these security features, rather than requiring that various security devices be connected to each IED or piece of monitored equipment. Such a configuration also reduces the potential area for attack by unauthorized users. As discussed above, access controller 150 may allow for communication with IEDs operating on any number of protocols, including legacy devices that may not natively include up to date security features and protocols. The use of access controller 150 may allow such legacy devices to remain in service and benefit from the secure environment created by access controller 150.

Figure 3:
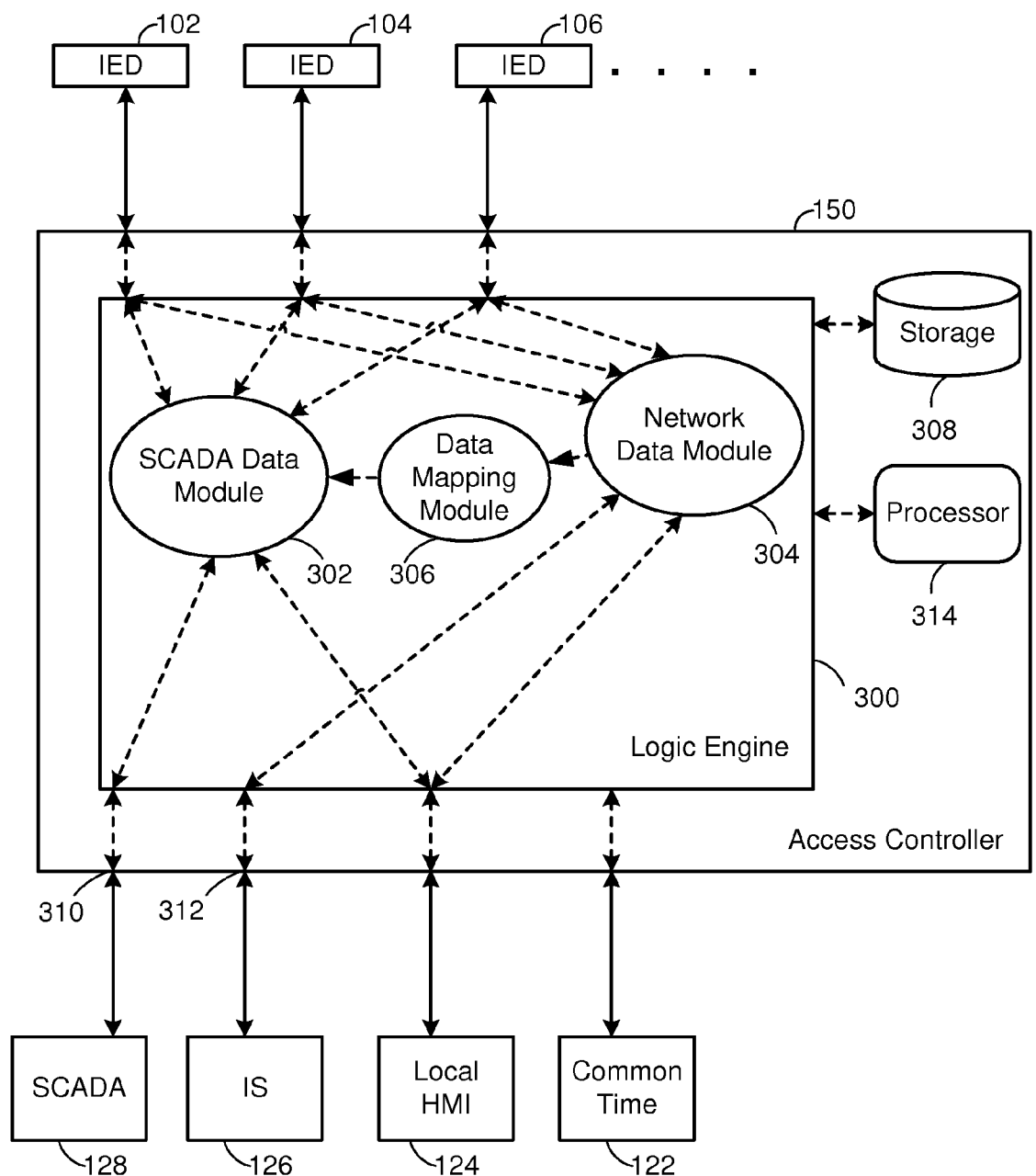
FIG. 3 is a block diagram illustrating a system for mapping network events to SCADA protocol data types.

The connection between access controller 150 and SCADA system 128 and information system 126 may be a single connection that is capable of simultaneously supporting the protocols and bandwidth requirements of SCADA system 128 and information system 126. FIG. 3 shows different connections for SCADA system 128 and information system 126; however, the different connections do not require two physically distinct connections. A fiber-optic or Ethernet connection, for example, may allow for a single physical connection between access controller 150 and SCADA system 128 and information system 126.

Figure 2:
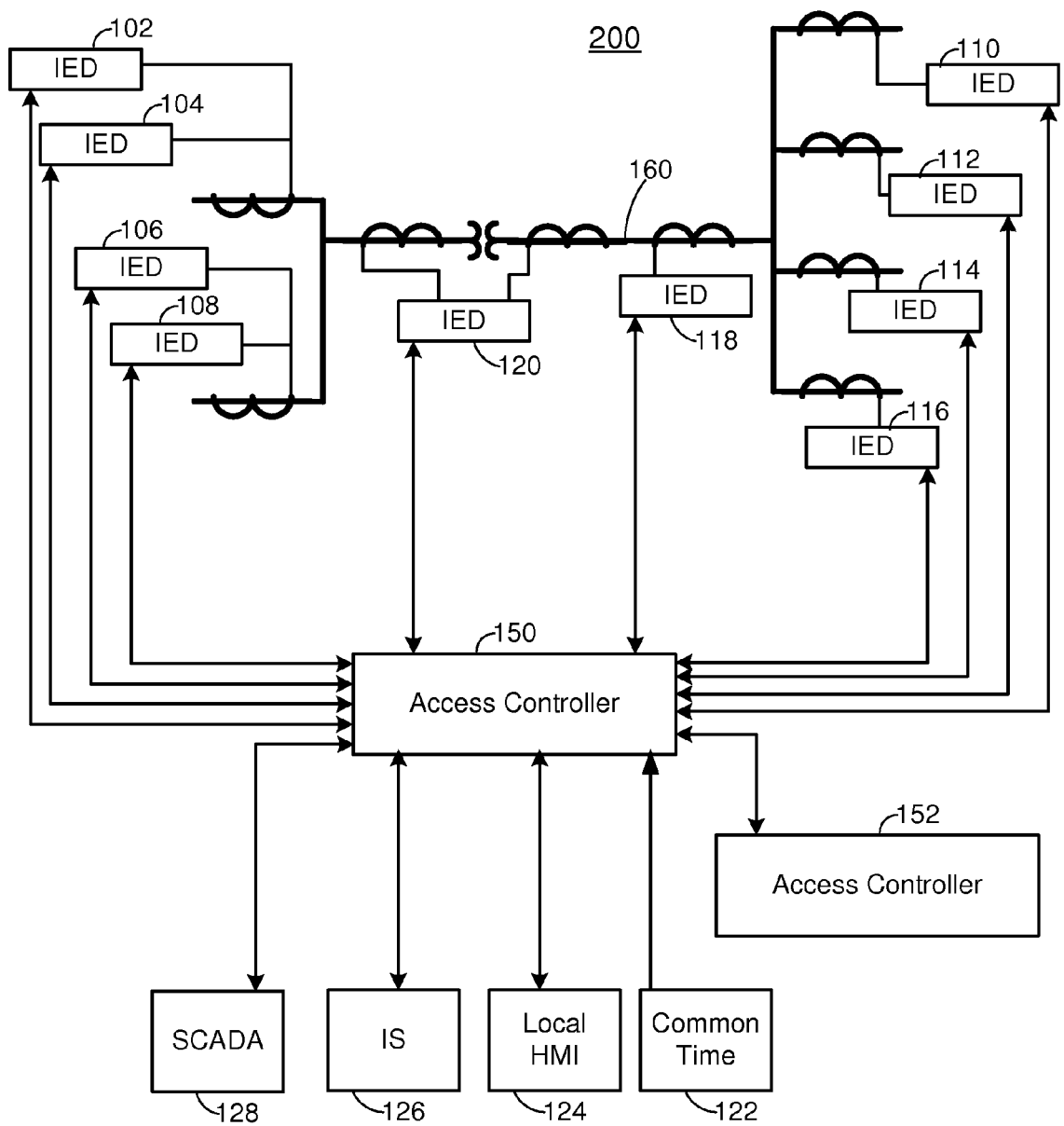
FIG. 2 illustrates a diagram of an automation, control, monitoring or protection system used in connection with a power system architecture.

In an embodiment illustrated in FIG. 2, access controller 150 is used in a power system architecture 200. Access controller 150 is in communication with IEDs 102-120, a second access controller 152 in a cascaded configuration, common time source 122, local HMI 124, information system 126, and SCADA system 128.

IEDs 102-120 receive power system information from the electric power system 160. The IEDs 102-120 may receive the power system information from sensors or from the monitored equipment in the power system or combinations thereof. IEDs may be individually configured as to what information they are to communicate to access controller 150. For example, IEDs 102-120 may receive current waveforms from current transducers installed on conductors or within other equipment of the electric power system. Likewise, IEDs 102-120 may receive voltage information from potential transducers installed on conductors or within other equipment of the electric power system. Alternatively, IEDs 102-120 may receive breaker status information directly from a circuit breaker (open or closed). IEDs 102-120 may receive tap information from voltage regulators. Other types of information may be gathered using IEDs may be known to one having skill in the art, but are not listed here.

IEDs 102-120 may further perform calculations on the power system information. Depending on the type, configuration, and settings of an individual IED, calculations may be performed that generate control instructions. For example, an IED may be configured to make calculations as to overcurrent conditions, undervoltage conditions, out-of-balance conditions, excessive power swing conditions, and to generate appropriate control instructions to address each condition.

FIG. 3 illustrates one embodiment for receiving, processing, and distributing information within access controller 150. IEDs 102-106 are in communication with access controller 150. Access controller 150 includes a logic engine (LE) 300 operating on a processor (314). LE 300 may operate in accordance with any number of protocols, network communication mediums, settings, and the like. Likewise, processor 308 may operate using any number of processing rates, architectures, and may be implemented using a general purpose or application specific processor.

In one embodiment, the LE 300 may operate in accordance with the International Electrotechnical Commission (IEC) 61131-3 standard. IEC 61131-3 defines two graphical and two textual PLC programming language standards. Languages included in the IEC 61131-3 standard are graphical languages, Ladder Diagram (LD) and Function Block Diagram (FBD), as well as textual languages, Structured Text (ST), Instruction List (IL), and Sequential Function Chart (SFC).

Monitored system data and network data from the various IEDs and access controller 150 are processed by LE 300. Monitored system data is routed to SCADA data module 302. Network data is routed to network data module 302. SCADA data module 302 processes data intended to be communicated to and from SCADA system 128 into data points corresponding with the communication protocol used by SCADA. SCADA data module 302 may translate information from one protocol to another protocol. For example, if SCADA system 128 expects data to be organized in accordance with the MODBUS TCP protocol, and IED 102 communicated data using the Schweitzer Engineering Laboratories Fast Message protocol, SCADA data module 302 will translate the data into the MODBUS TCP protocol. SCADA data module 302 may then form data packets according to the expected SCADA protocol and transmit the data packets to SCADA system 128 using SCADA communications interface 310.

Network data received from IEDs 102-106 or generated by access controller 150 is processed by network data module 304. Network data module 304 processes the data intended for information system 126 into the format or protocol expected by information system 126. For example, if information system 126 expects communication according to the TCP/IP protocol, then network data module 304 will map the data intended for information system 126 into the TCP/IP protocol. Network data module 304 may then form data packets according to the expected network protocol and transmit the data packets to information system 126 using information system communications interface 312.

LE 300 further includes data-mapping module 306 configured to map data from network data module 304 to SCADA data module 302. As described above, it may be desirable to communicate network data that is typically only communicated to information system 126 to SCADA system 128. The conditions for determining which network events are sent to data mapping module 306 can be selected based on operational importance. For example, network data module 304 may be configured to not transmit data routine network events (i.e. a successful user logon) to data mapping module 306 because such events are not of operational importance. On the other hand, network data module 304 may be configured to transmit repeated failed attempts to logon to data mapping module 306 because such activity may indicate that an unauthorized user is attempting to gain access to the system. In this manner, only the network events and data that are important for SCADA system 128 to receive for monitoring and operations will be mapped into the SCADA module 302. The conditions for selecting which events will be mapped may be based on programmable logic in LE 300.

Access controller 150 may include a computer readable storage medium 308. Computer readable storage medium 308 may serve a variety of functions, such as maintaining a log of monitored system data and network data. The log may include timestamps indicating the receipt time of each piece of data and may serve as an on site backup to data transmitted to SCADA system 128 and information system 126. Computer readable storage medium 308 may also be the repository of software modules or other computer readable instructions utilized by access controller 150. Computer readable storage medium 308 may be any type of computer readable storage medium, including but not limited to a hard drive or flash memory. Computer readable storage medium 308 may be accessible via SCADA system 128 (connection not shown), via information system 126 (connection not shown), or via local HMI 124 (connection not shown).

Figure 4:
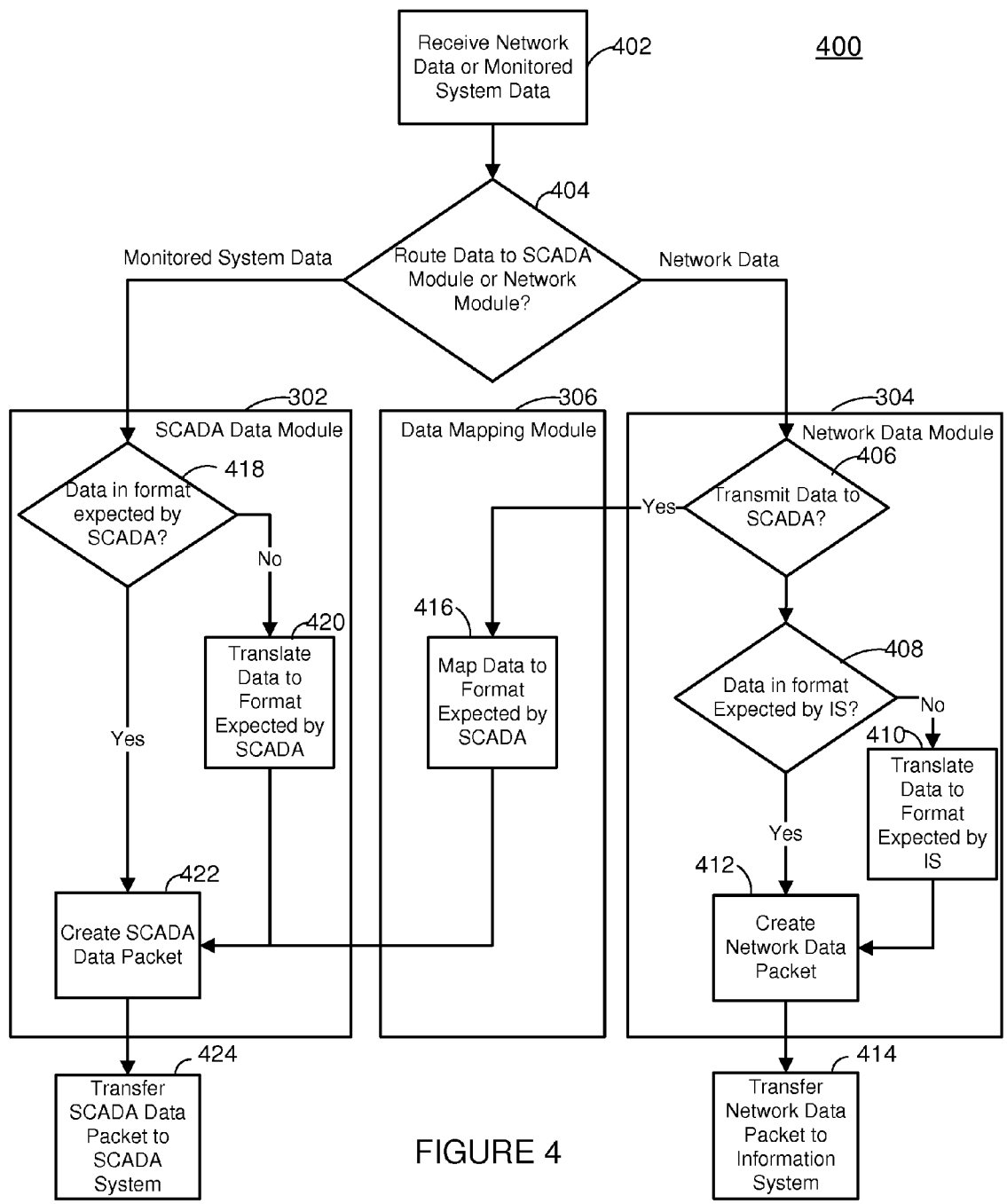
FIG. 4 is a flowchart showing a process for mapping network events to SCADA protocol data types.

FIG. 4 illustrates a process 400 performed by one embodiment of access controller 150 in receiving a network event, mapping the event to a format expected by a SCADA system, and transmitting the mapped network event to the SCADA system. In step 402 network data or monitored system data is received. In step 404, monitored system data is routed to SCADA data module 302, while network data is routed to network data module 304.

In step 406, the network data module determines whether the network data is of a type that is to be transmitted to a SCADA system. As discussed above, only certain network data may be of interest to SCADA operators. If the network data is of the type that is transmitted to SCADA, the network data is also routed to data mapping module 306 and the process continues to step 416.

All network data continues from step 406 to 408, where network data module 304 determines whether the data received is in the format expected by an information system. If the data is not in the expected format, the data is translated in step 410. In step 412, the data is in the expected format, and a network data packet is created. In step 412 a data packet header may be created including routing information indicating the source and destination of the packet, the length of the packet, and error-checking or error-correcting information. The network data packet is transmitted to the information system in step 414.

In step 416, the network data is mapped into a format expected by SCADA. As discussed herein, data may be mapped into a variety of formats. The mapped data format may be any data format used by the SCADA system. In step 416 a data type conversion (i.e. conversion to an analog data type) may be performed if necessary.

In step 418 SCADA data module 302 determines whether the monitored system data is in a format expected by the SCADA system. If the data is not in the expected format, the data is translated in step 420. The translation performed at steps 420 and 410 may allow for the use of any number of different protocols, thus allowing for the use of devices that may communicate with access controller 150 using different protocols.

In step 422, the data (including translated data or mapped network data) is in the format expected by the SCADA system, and a SCADA data packet is created. As with a network packet, a SCADA data packet may include a header containing routing information indicating the source and destination of the packet, the length of the packet, and error-checking or error-correcting information. The SCADA data packet is transmitted to the SCADA system in step 424.

Figure 5:
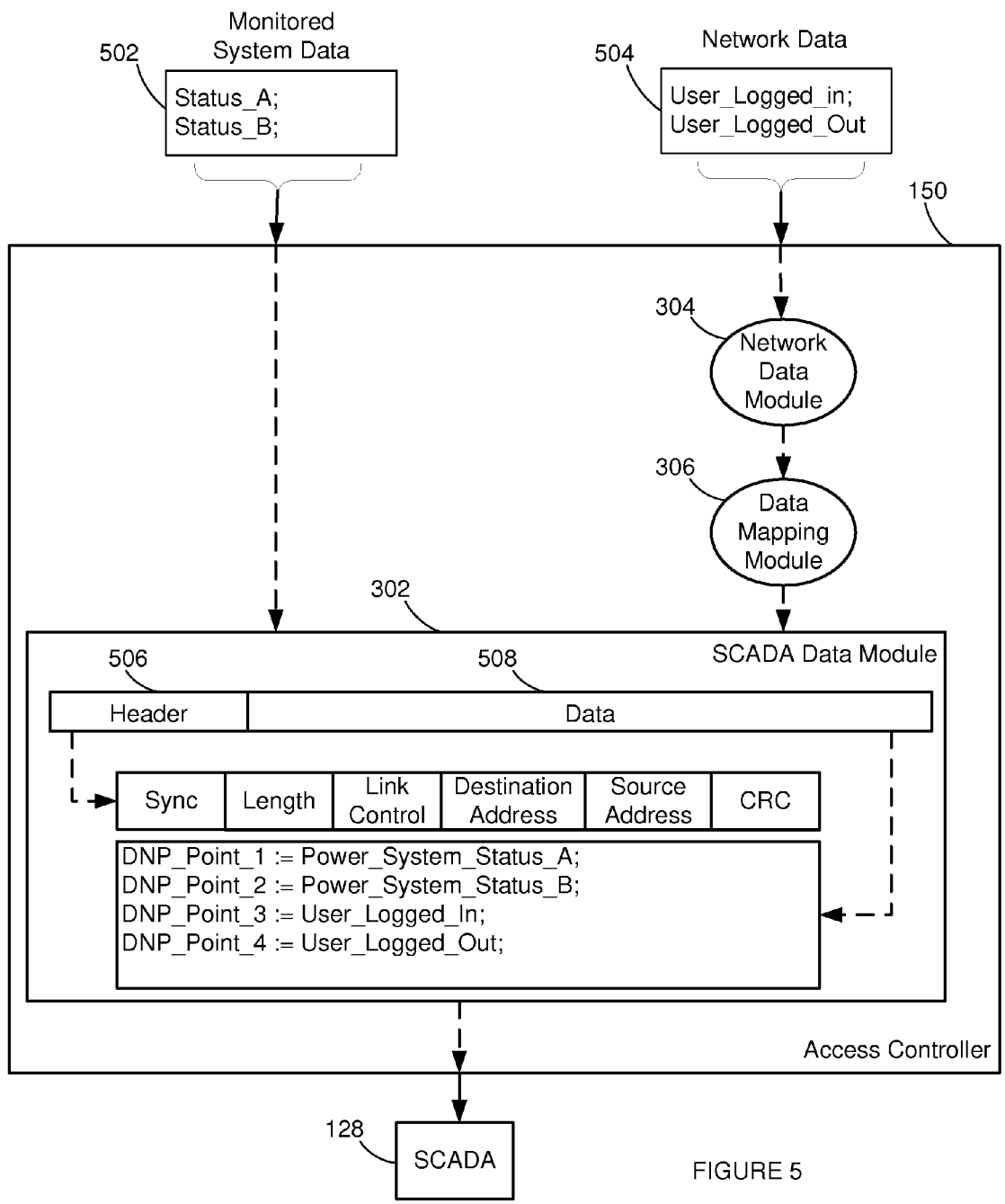
FIG. 5 is a block diagram of a process for mapping network events to SCADA protocol data types in an access controller.

FIG. 5 illustrates a block diagram of the data mapping process occurring within LE 300. FIG. 5 illustrates how network events from access controller and its connected IEDs may be communicated to SCADA using existing SCADA protocols. Specifically, FIG. 5 illustrates the mapping of network data 504 into a DNP data packet. Network data 504 passes through network data module 304. Network data module 304 passes the data on to data mapping module 306, which creates mapped network data for use by SCADA Data Module 302.

FIG. 5 further illustrates mapping of monitored system data 502 into a DNP data frame. Data-mapping module 306 maps network data 504 and monitored system data 502 into the DNP packet. The DNP packet may be restricted to containing either data from network events module 304 or power system data, or as shown, the DNP packet may contain both network data and monitored system data.

SCADA Data Module formats the DNP packet for transmission to SCADA system 128. The DNP frame includes a header section 506 (which includes sync, length, link control, destination address, source address, and cyclic redundancy check information) and a data section 508. Data points associated with network data 504 are mapped into the data section 508 of the DNP frame. DNP_Point_3 and DNP_Point_4 are mapped using the Structured Text programming language provided by the IEC 61131-3 standard to network events representing a user logging in and logging out. In this example, DNP_Point_3 and DNP_Point_4 are DNP analog data types. DNP_Point_3 is associated to a user login network event and DNP_Point_4 is a user logout network event. In this case, the data mapping module 306 will populate DNP_Point_3 with an integer appropriate for the user logging into the system. Likewise, it will populate DNP_Point_4 with an integer appropriate for the user logging out of the system. In this example, the integer to be used for each user is configurable within data-mapping module 306. A data type conversion may or may not be necessary depending on the network event data.

Figure 6:
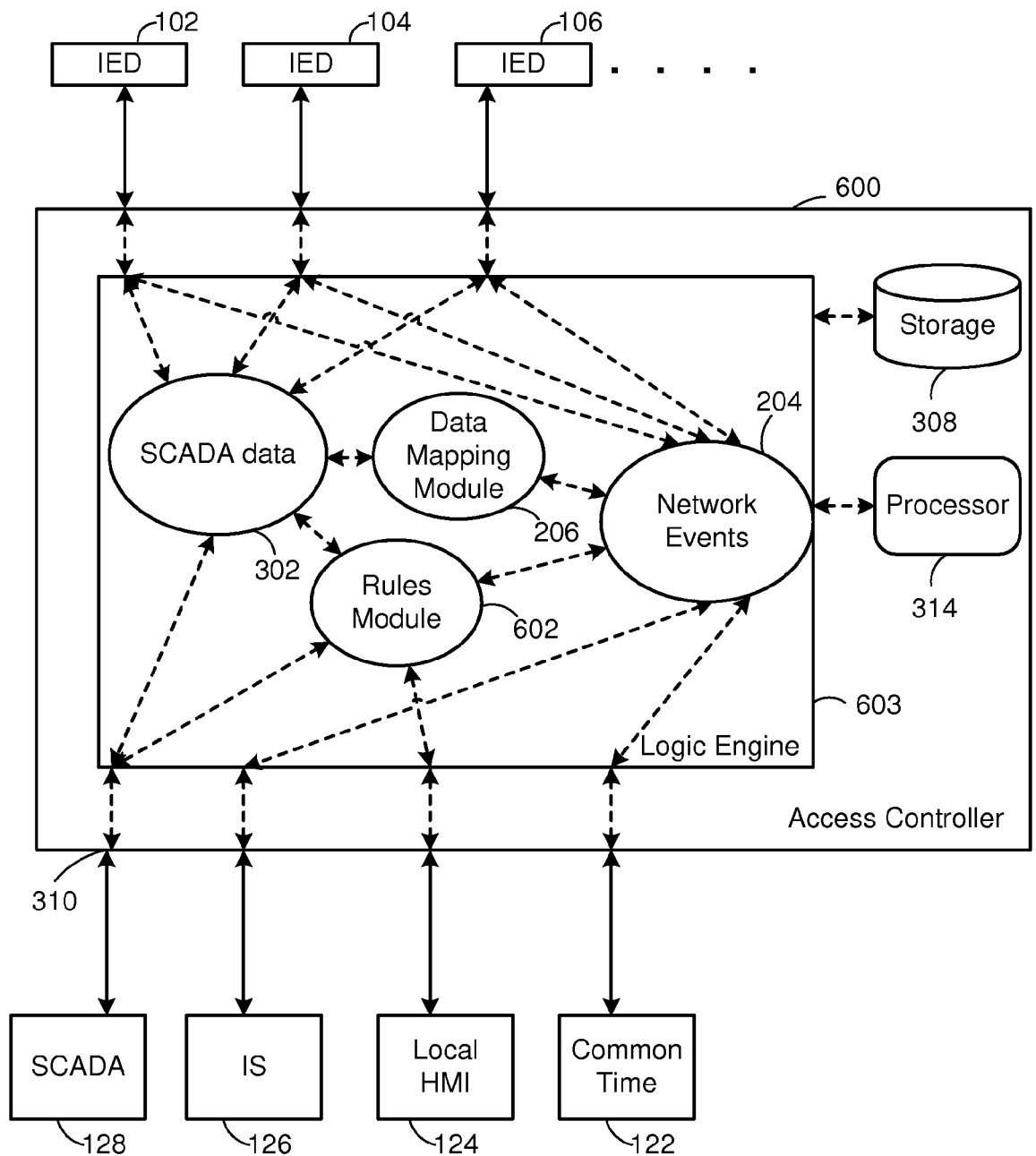
FIG. 6 is a block diagram illustrating a programmable rules module within an access controller.

FIG. 6 illustrates a block diagram of an access controller 600 that also includes a rules module 602 operating within a LE 603. Rules module 602 may be used to implement rules that govern actions to be taken in response to network data or SCADA data monitored by access controller 600.

Rules module 602 may be used to generate and control network and user access rules using the rules module 602. One benefit of the rules module 602 is that actions may be taken to prevent unwanted access more quickly than by simply monitoring data received by SCADA system. Implementing rules using rules module 602 avoids inevitable communication delays and/or human interaction latencies that would be incurred by transmitting data to SCADA system 128 or information system 126 and awaiting the intervention of an operator. Computer readable storage medium 308 may further store a log of actions taken by rules module 602, and may also store various modules for storing, creating, modifying, and implementing various rules. Rules may be added to rules module 602 using local HMI 124 or SCADA 128, and may be programmed according to the IED 61131-3 standard.

Using rules module 602, a user may create rules that govern access to access controller 600 and/or IEDs based on certain network events and/or information from the SCADA data module 302. For example, rules module 602 may implement rules to increase or decrease user access to access controller 600, an individual IED, and/or all connected IEDs based on certain conditions. Rules module 602 may be configured as a firewall (e.g. a device that inspects traffic passing through it, and denies or permits passage based on a set of rules). Rule module 602 may be configured to administer user account rules governing access to access controller 600 or various IEDs connected to access controller 600. Rules module 602 may administer user account rules such as requiring users to change passwords after a specified length of time or number of logins, granting varying levels of access to different users (e.g. read only access, read/write access), or automatically making available certain types of data when a particular user logs in.

Rules module 602 may also be configured to implement control instructions, automation actions, and/or protection actions in conjunction with various IEDs. For example, when SCADA data meets conditions defined by a rule, rules module 602 may issue a control instruction to an IED in communication with a circuit breaker to open and/or close the circuit breaker, thus connecting or disconnecting a portion of a power system. In another example, rules module 602 may issue a control instruction to an IED in communication with a voltage regulator to tap up and/or down when SCADA data meets conditions defined by a rule.

Figure 7:
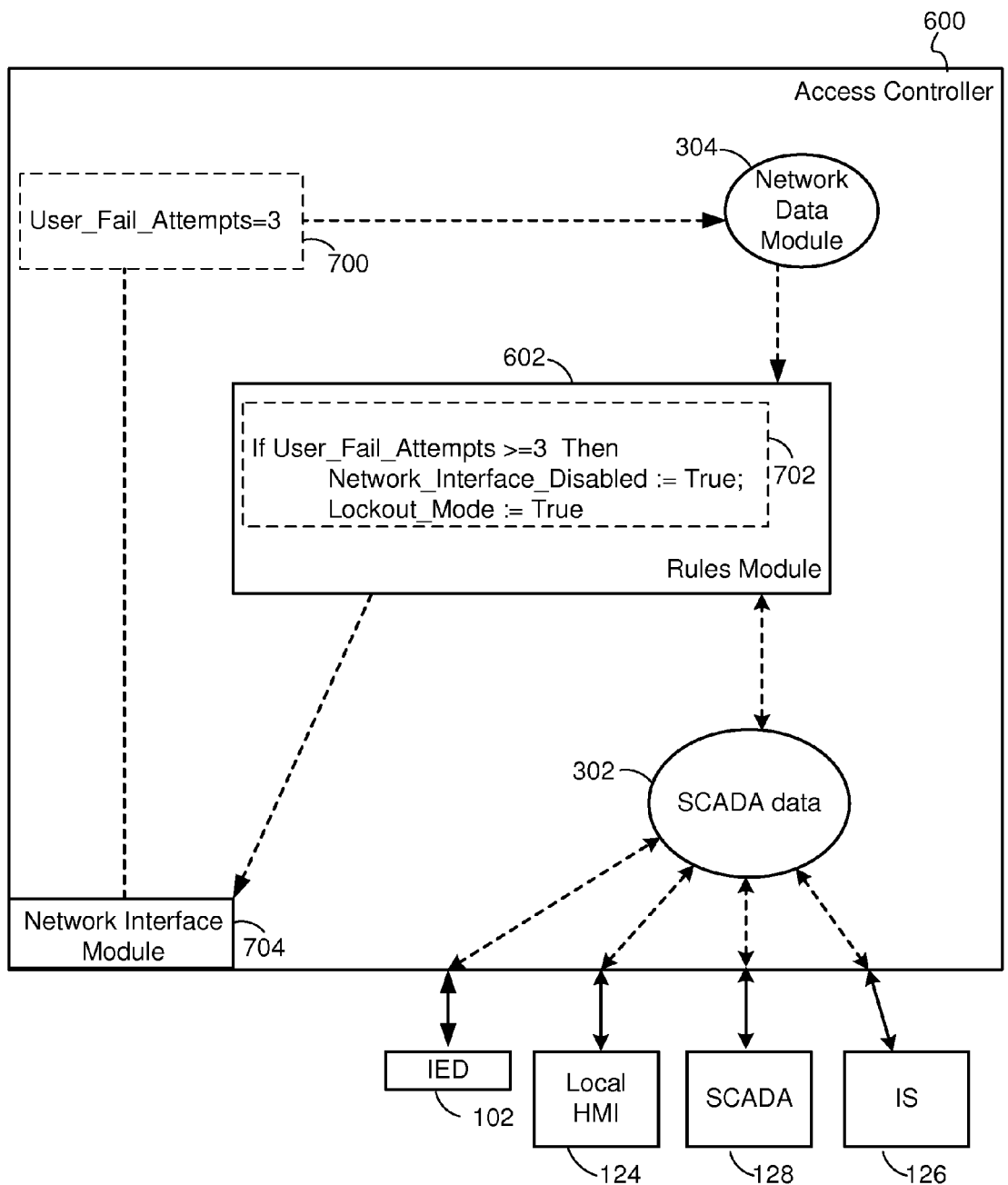
FIG. 7 is a flow chart illustrating the process of mapping a network event to a SCADA system.

FIG. 7 illustrates the implementation of a rule 702 that governs actions to be taken in the event of three failed attempts to log into access controller 600. In the example, once three consecutive failed attempts to log into access controller 600 have been made, the rules module 602 issues a control instruction causing access controller 600 to enter a lockout mode. The process begins after the third failed login attempt, when network interface module 704 generates a network event 700 indicating that the variable User_Fail_Attempts is equal to 3. Network event 700 is communicated to network data module 304. Network data module 304 is configured to alert rules module 602 in the event of three failed user logins. Rules module 602 compares the incoming network event 700 to rule 702. The condition tested by the rule is true. Rules module 602 then sets variables Network_Interface_Disabled and Lockout_Mode to a state of "True". These variables cause access controller 600 to end communication using network interface module 704 thus disabling any potential threats posed by the network communication. Continuing the example, the rules module may further send a command to IED 102 to take some protective action, such as entering lockout mode, tripping a breaker, closing a contact output, or disabling its network interface module depending on the functionality available in IED 102. Access controller 600 communicates the failed login network events and the actions implemented by rules module 602 to both SCADA 128 and IS 126

Embodiments disclosed herein may include various steps, which may be embodied in computer executable instructions stored on a computer readable medium to be executed by a general-purpose or special-purpose computer (or other electronic device). For example, the access controller described above may be implemented using a programmable logic controller. The computer readable medium described herein may include, but is not limited to, hard drives, floppy diskettes, optical disks, CD-ROMs, DVD-ROMs, ROMs, RAMs, flash memory, EPROMs, EEPROMs, magnetic or optical cards, solid-state memory devices, or other types of media/computer readable medium suitable for storing electronic instructions. Alternatively, the steps may be performed by hardware components that include specific logic for performing the steps or by a combination of hardware, software, and/or firmware.

Several aspects of the embodiments described have been illustrated as software modules or components. As used herein, a software module or component may include any type of computer instruction or computer executable code located within a memory device. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system for communicating a network event and monitored system data from an Intelligent Electronic Device (IED) to a central monitoring system comprising:

a plurality of IEDs in communication with and separate from monitored equipment,
gathering monitored equipment information therefrom for producing monitored system data relating to a status of an electric power distribution system, and, transmitting the monitored system data;
an access controller in communication with the plurality of IEDs and configured to receive the monitored system data from the plurality of IEDs, and further receiving the network event, the access controller comprising:
an IED interface to communicate with the plurality of IEDs
a central monitoring system communications interface to transmit the monitored equipment information to the central monitoring system according to a Supervisory Control and Data Acquisition (SCADA) format used by the central monitoring system;
an information system communications interface to communicate with an information system according to a non-SCADA format used by the information system;
a processor; and
a logic engine receiving the network event according to the non-SCADA format, transmitting the network event to the information system in the non-SCADA format, data mapping the network event into the SCADA format, and transmitting the mapped network event to the central monitoring system through the central monitoring system communications interface in the SCADA format;
wherein the SCADA format and the non-SCADA format comprise distinct communication protocols and the central monitoring system is incapable of communication using the non-SCADA format.

2. The system of claim 1 wherein the access controller further comprises a local human machine interface.

3. The system of claim 1 wherein the access controller further comprises a common time interface.

4. The system of claim 1 wherein the logic engine stores the network event.

5. The system of claim 4 wherein the central monitoring system communications interface is configured to receive the network event.

6. The system of claim 4 wherein the information system communications interface is configured to receive the network event.

7. The system of claim 1 wherein the network event module is further configured to determine if the network event satisfies a condition, and to selectively transmit the network event to the data mapping module if the network event satisfies the condition.

8. The system of claim 7 wherein the condition is programmable in compliance with the IEC-61131-3 standard.

9. The system of claim 1 wherein the access controller further comprises a rules module executable on the processor and configured to receive the network event, to generate a control instruction based on the network event and a rule, and to transmit the control instruction to an intelligent electronic device in communication with the access controller.

10. The system of claim 9 wherein the computer readable storage medium is configured to store the control instruction.

11. The system of claim 9 wherein the rules module is programmable in compliance with the IEC-61131-3 standard.

12. The system of claim 9 wherein the rules module is configured to administer a rule governing user access to the access controller.

13. The system of claim 9 wherein the rules module is configured to administer a rule governing user access to the intelligent electronic device.

14. The system of claim 9 wherein the rules module automatically makes available data specified in a rule based on login information provided by a user.

15. The system of claim 9 wherein the rules module is configured as a firewall.

16. The system of claim 1 wherein the access controller is a programmable logic controller.

17. The system of claim 1, wherein the central monitoring system comprises one of a Supervisory Control and Data Acquisition (SCADA) system, an outage management systems, an Automatic Meter Reading (AMR) system, and an Advanced Metering Infrastructure (AMI) system.

18. The system of claim 17, wherein the central monitoring system format is selected from the group consisting of DNP3, MODBUS RTU, MODBUS TCP, IEC 61850 and IEEE C37.118.

19. The system of claim 1, wherein the information system comprises a plurality of devices configured to transmit network communications.

20. The system of claim 19, wherein the plurality of devices comprises at least one of a modem, a router, and a firewall.

21. The system of claim 19, wherein the information system is configured to implement a network security policy.

22. The system of claim 21, wherein the network security policy comprises selectively permitting remote network access to a remote user based on a rule governing user access.

23. An access controller, comprising:
a first interface receiving a network event from an Intelligent Electronic Device (IED) of an electric power distribution system according to a network format, the network event comprising an indication of a status change associated with an information system configured to govern access to a plurality of network devices associated with the electric power distribution system;
a second interface communicating monitored system data to a central monitoring system according to a Supervisory Control and Data Acquisition (SCADA) format, the network event and the monitored system data comprising distinct data communicated according to distinct formats, wherein the network format is a non-SCADA format;
an information system communications interface to communicate with an information system according to the network format used by the information system;
an IED interface communicating with a plurality of connected IEDs, the plurality of IEDs
in communication with monitored equipment,
gathering monitored equipment information therefrom for producing the monitored system data, and,
transmitting the monitored system data to the IED interface,
the IED interface configured to receive the monitored system data from the plurality of IEDs;
a microprocessor; and
a logic engine in communication with the first interface the second interface, and the information system communications interface, wherein the logic engine:
maps the network event from the network format into the SCADA format and transmits the mapped network event to the central monitoring system through the second interface; and
transmits the network event in the network format to the information system through the information system communications interface.

24. The system of claim 23 wherein the format used by the central monitoring system format is selected from the group consisting of DNP3, MODBUS RTU, MODBUS TCP, IEC 61850 and IEEE C37.118.

25. The system of claim 23 wherein the computer readable storage medium is further configured to store the network event.

26. The system of claim 23 wherein the access controller further comprises:
a rules module configured
to receive the network event;
to generate a control instruction based on the network event and a rule; and
to transmit the control instruction to an intelligent electronic device in communication with the access controller.

27. The system of claim 26 wherein the rules module is programmable in compliance with the IEC-61131-3 standard.

28. The system of claim 26 wherein the computer readable storage medium is further configured to store the control instruction.

29. A method for communicating a network event to a central monitoring system comprising:
an access controller receiving a network event in a first format at an Intelligent Electronic Device (IED) interface;
gathering monitored equipment information from a plurality of IEDs in communication with and separate from monitored equipment;
the plurality of IEDs producing monitored system data relating to a status of an electric power distribution system from the monitored equipment information;
the plurality of IEDs transmitting the monitored system data in a Supervisory Control and Data Acquisition (SCADA) format to the access controller, wherein the access controller transmits the monitored system data in the SCADA format to a central monitoring system configured to use the monitored system data to maintain stability of the electric power distribution system;
the access controller receiving the monitored system data from the plurality of IEDs at the IED interface;
the plurality of IEDs communicating the network event and the monitored system data to the access controller, the network event and the monitored system data comprising distinct data communicated according to the first format, and the SCADA format, respectively, wherein the first format and SCADA format are distinct formats;
the access controller generating a mapped network event by mapping the network event from the first format to the SCADA format using a logic engine;
the access controller communicating the mapped network event to the central monitoring system using a second interface; and
the access controller communicating the network event to an information system using the first format.

30. The method of claim 29 further comprising:
receiving the monitored system data from a monitored equipment; and
storing the network event and the monitored system data using a computer readable storage medium.

31. The method of claim 29 further comprising:
comparing the network event to a condition specified in a rule; and
generating a control instruction if the condition specified in the rule is met.

32. A system for communicating a network event and monitored system data from an Intelligent Electronic Device (IED) to a Supervisory Control and Data Acquisition (SCADA) system, comprising:
a plurality of IEDs in communication with and separate from monitored equipment,
gathering monitored equipment information therefrom for producing monitored system data relating to a status of an electric power distribution system, and,
transmitting the monitored system data to a central monitoring system that uses the monitored system data to maintain stability of the electric power distribution system;
an access controller in communication with the plurality of IEDs and to receive the monitored system data from the plurality of IEDs, and further receiving the network event, the access controller comprising:
an IED interface to communicate with the plurality of IEDs to receive the network event and monitored system data;
a SCADA communications interface to communicate with the central monitoring system according to a first format selected from the group consisting of DNP3, MODBUS RTU, MODBUS TCP, IEC 061850 and IEEE C37.118;
an information system communications interface to communicate with an information system according to a second format, the information system comprising a distinct system from the central monitoring system;
a processor; and
a logic engine that:
receives the network event,
transmits the network event to the information system using the second format,
data maps the network event into the first format, and
transmits the mapped network event, and the monitored system data to the central monitoring system through the SCADA communications interface using the first format.

33. The system of claim 32, wherein the access controller further comprises a local human machine interface.

34. The system of claim 32, wherein the access controller further comprises a common time interface.

35. The system of claim 32, wherein the logic engine stores the network event.

36. The system of claim 32, wherein the network event module is further configured to determine if the network event satisfies a condition, and to selectively transmit the network event to the data mapping module if the network event satisfies the condition.

37. The system of claim 36, wherein the condition is programmable in compliance with the IEC-61131-3 standard.

38. The system of claim 32, wherein the access controller further comprises a rules module executable on the processor and configured to receive the network event, to generate a control instruction based on the network event and a rule, and to transmit the control instruction to an intelligent electronic device in communication with the access controller.

39. The system of claim 38, wherein the computer readable storage medium is configured to store the control instruction.

40. The system of claim 38, wherein the rules module is configured perform an action selected from the group consisting of: governing user access to the access controller; governing user access to the intelligent electronic device; making available data specified in a rule based on login information provided by a user; and acting as a firewall.

41. The system of claim 38, wherein the access controller comprises a programmable logic controller.

\* \* \* \* \*